(12) United States Patent
Yoo

(10) Patent No.: US 7,473,022 B2
(45) Date of Patent: Jan. 6, 2009

(54) BACKLIGHT UNIT CAPABLE OF EASILY FORMING CURVED AND THREE-DIMENSIONAL SHAPE

(75) Inventor: Tae Kun Yoo, Goyang-si (KR)

(73) Assignee: Fawoo Technology Co., Ltd., Gyeonggi-Do (KR)

( * ) Notice: Subject to any disclaimer, the term of this patent is extended or adjusted under 35 U.S.C. 154(b) by 0 days.

(21) Appl. No.: 11/417,733

(22) Filed: May 4, 2006

(65) Prior Publication Data

US 2007/0091639 A1   Apr. 26, 2007

(30) Foreign Application Priority Data

Oct. 26, 2005   (KR) .................. 10-2005-0101018
Dec. 21, 2005   (KR) .................. 10-2005-0126542
Jan. 6, 2006    (KR) .................. 10-2006-0001562

(51) Int. Cl.
   *F21V 7/04* (2006.01)
(52) U.S. Cl. ............... 362/621; 362/612; 362/613; 362/630; 362/634; 362/294; 362/580
(58) Field of Classification Search ........ 362/612, 362/613, 630, 634, 294, 580, 621
   See application file for complete search history.

(56) References Cited

U.S. PATENT DOCUMENTS

| | | | |
|---|---|---|---|
| 6,388,722 B1 * | 5/2002 | Yoshii et al. | 349/62 |
| 2003/0053007 A1 * | 3/2003 | Higashi | 349/65 |
| 2004/0130884 A1 * | 7/2004 | Yoo et al. | 362/31 |
| 2006/0146530 A1 * | 7/2006 | Park et al. | 362/240 |
| 2007/0019419 A1 * | 1/2007 | Hafuka et al. | 362/373 |
| 2007/0081339 A1 * | 4/2007 | Chung et al. | 362/294 |

* cited by examiner

*Primary Examiner*—Stephen F Husar
*Assistant Examiner*—Jessica L McMillan
(74) *Attorney, Agent, or Firm*—Kirton & McConkie; Evan R. Witt

(57) ABSTRACT

Disclosed herein is a backlight unit, capable of easily forming a curved or three-dimensional shape. The backlight unit according to the present invention comprises a light guide panel which includes a light guide plate having on one surface or both surfaces thereof a plurality of notches, an uneven dot pattern, a printed dot pattern or a sanded surface, or a light diffusion plate; a luminous means which includes a lamp mounted on a PCB to emit light to the light guide panel; a groove formed along an edge of the light guide panel so that the luminous means is installed in the light guide panel; and a thin heat radiating plate fixed on a back surface of the PCB along the groove.

20 Claims, 18 Drawing Sheets

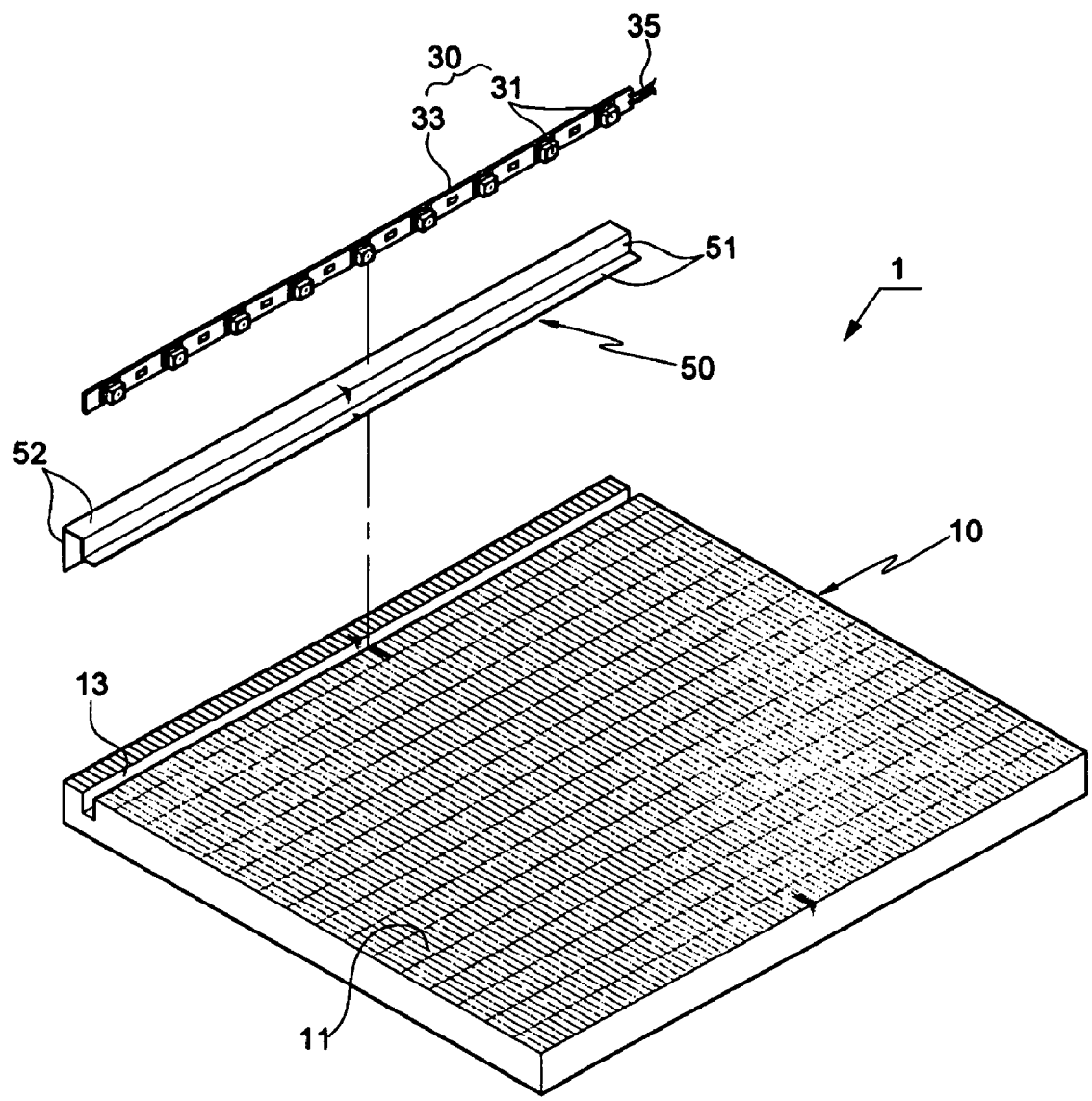

BACKLIGHT UNIT CAPABLE OF EASILY FORMING CURVED AND THREE-DIMENSIONAL SHAPE

BACKGROUND OF THE INVENTION

1. Field of the Invention

The present invention relates to a backlight unit capable of easily forming a curved or three-dimensional shape, and more particularly, to a backlight unit, in which a heat radiating plate comprises a thin plate so that a light guide panel has a curved shape, thus easily conforming to a PCB (Printed Circuit Board) even when it is installed to have a curved shape, and which has excellent waterproofness, to protect a luminous means and a circuit even when the backlight unit is installed under water, thus maximizing the lifespan of a lamp.

Further, the present invention relates to a backlight unit capable of easily forming a curved or three-dimensional shape, which is constructed so that the front of a light guide panel is neat and tidy, and all components including an electric wire are accommodated within the thickness of the light guide panel, thus being resistant to external interference or impact, being easy to handle, and minimizing the likelihood of damage thereto. Further, the present invention facilitates packaging or installing operation, and enables the manufacturing of various shapes of backlight units, using a flexible PCB.

2. Description of the Related Art

Generally, a backlight unit used for an LCD (Liquid Crystal Display), advertisement, illumination, floor illumination, a decoration, etc. includes a light guide panel comprising a light transmittable acrylic plate or a transmittable plate made of a mixture of acryl and a light diffusing substance. A lamp, which emits light, is mounted on one side of the light guide panel. A predetermined pattern of notches, an uneven dot pattern, a printed dot pattern, or a sanded surface is provided on a surface of the light guide panel so as to guide the optical path or light diffusion of the lamp.

FIG. 1a is a rear view showing the construction of a conventional backlight unit 100, and FIG. 1b is a detailed sectional view taken along line A-A of FIG. 1a.

Referring to FIGS. 1a and 1b, the backlight unit is constructed as follows. That is, lamps 131 emitting light are provided on one side of a light guide panel 110 which is made of a light transmitting material. A plurality of V-shaped notches 112 is formed on the back surface of the light guide panel 110 in horizontal and vertical directions so as to uniformly diffuse light emitted from the side of the light guide panel 110 toward the front of the light guide panel 110 to which a display film 140 is attached. A reflection sheet 150 made of a PET material may be adhered to the back surface of the light guide panel 110 having the V-shaped notches.

Further, a heat radiating plate 180 is secured to a PCB 133 having the lamps 131, and a bracket 170 is additionally installed to support the lamps 131, the heat radiating plate 180, etc.

SUMMARY OF THE INVENTION

The backlight unit is mainly to be used in a light transmitting illumination means of an advertising structure to meet corporate demand. However, if the backlight unit is applied to interior decoration items for consumers, such as pictures or photographs, it could create considerable demand.

However, the conventional backlight unit 100 was problematic in that the PCB must adhere to the heat radiating plate 180, and the bracket 170 must be separately fastened to the light guide panel using tape, a screw, etc., so that the backlight unit 100 was marketed and sold to consumers in the form of a finished product having a fixed specification, thus it was difficult to custom-make the backlight unit according to individuals' special requirements.

Further, it was impossible to manufacture shapes other than a rectangular shape.

In other words, the prior art had several problems, in terms of the operation of cutting the light guide panel and the bracket 170, the installation of the luminous means, and the assembly of the bracket, so that it was difficult to manufacture the backlight unit at a desired site. Thus, the usefulness of the backlight unit was low, so that the applicable field of the backlight unit was limited.

Further, since the bracket had to be separately provided, the cost of materials and the working period were increased, and thus the cost of manufacturing the backlight unit was increased.

Since the bracket and the heat radiating plate were manufactured through aluminum extrusion, they had considerable thickness of about 1 mm at least, so the bracket and the heat radiating plate were not easily bent. Thus, when the light guide panel and the PCB were bent in a curved shape, it was impossible to manufacture the backlight unit at a desired site. Further, due to the thickness of the heat radiating plate, a step was formed, in which case when backlight units were loaded or carried in large quantities, fillers must be provided so as to compensate for the difference in thickness, thus inconveniencing a manufacturer. Even when a consumer assembles the backlight unit, the step caused by the thickness difference must be compensated.

Accordingly, the present invention has been made keeping in mind the above problems occurring in the prior art, and an object of the present invention is to provide a backlight unit, which does not require a bracket installing operation or a PCB adhering operation, thus reducing a manufacturing cost, and in which a heat radiating plate comprises a thin plate, so that it is convenient to make it conform to a light guide panel and a PCB provided in a curved shape, and it is not necessary to compensate for a surface step, and in which the appearance and groove of the backlight unit are formed using a carving tool at a shop, a light source and the heat radiating plate are then mounted on the backlight unit, and thereafter the backlight unit is sealed with tape, thus affording convenience.

Another object of the present invention is to provide a backlight unit, which is easily custom-made at a desired site according to consumers' special requirements, thus easily and rapidly satisfying individuals' demands as well as companies' demands, thus extending the applicable range to a backlight unit for individual use, therefore maximizing the accessibility to consumers, and creating vast demands.

A further object of the present invention is to provide a backlight unit, capable of easily forming a curved shape or a three-dimensional shape through vacuum forming.

In order to accomplish the above objects, the present invention provides a backlight unit comprising a light guide panel which includes a light guide plate having on one surface or both surfaces thereof a plurality of notches, an uneven dot pattern, a printed dot pattern or a sanded surface, or a light diffusion plate; a luminous means which includes a lamp mounted on a PCB to emit light to the light guide panel; a groove formed along an edge of the light guide panel so that the luminous means is installed in the light guide panel; and a thin heat radiating plate fixed on a back surface of the PCB along the groove.

BRIEF DESCRIPTION OF THE DRAWINGS

The above and other objects, features and advantages of the present invention will be more clearly understood from the following detailed description taken in conjunction with the accompanying drawings, in which:

FIG. 1b is a detailed sectional view taken along line A-A of FIG. 1a;

FIG. 2 is an exploded perspective view showing a backlight unit, according to the first embodiment of the present invention;

DESCRIPTION OF THE PREFERRED EMBODIMENTS

Hereinafter, a backlight unit capable of easily forming a curved or three-dimensional shape, according to the preferred embodiment of the present invention, will be described in detail with reference to the accompanying drawings.

Figure 1A:
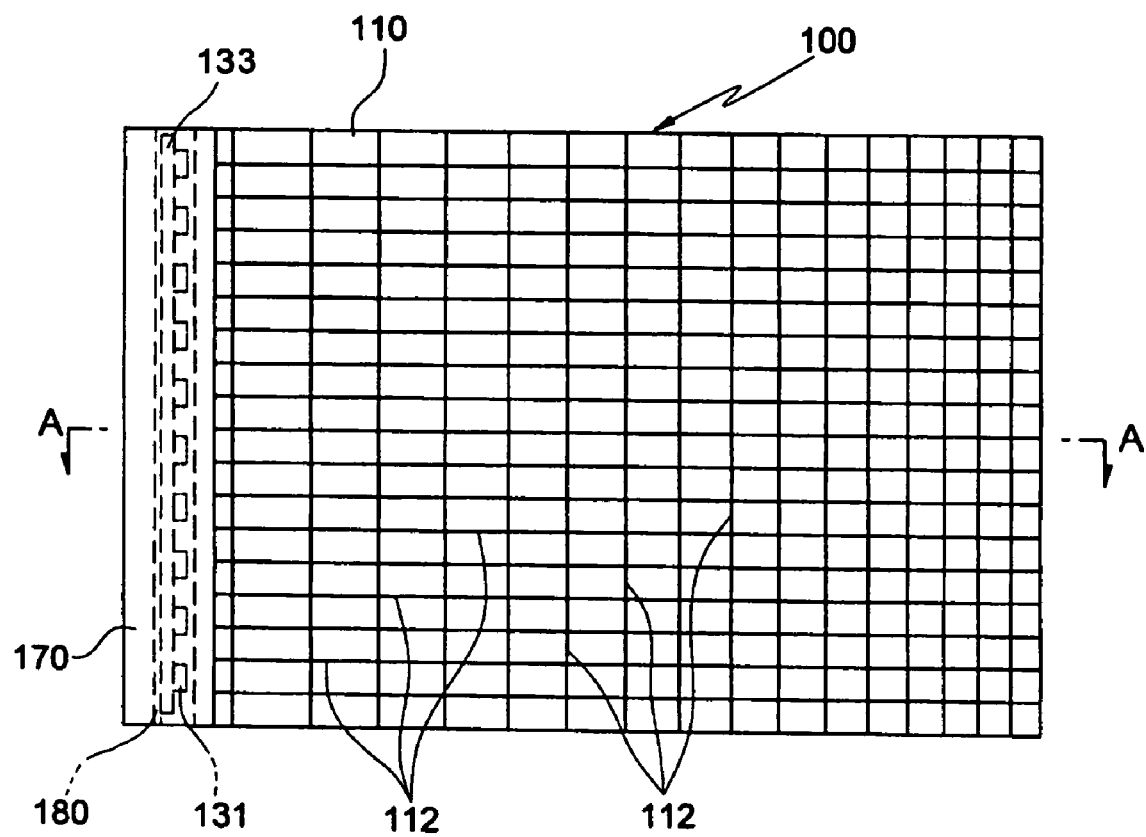
FIG. 1a is a rear view showing the construction of a general light guide panel.
Figure 1B:
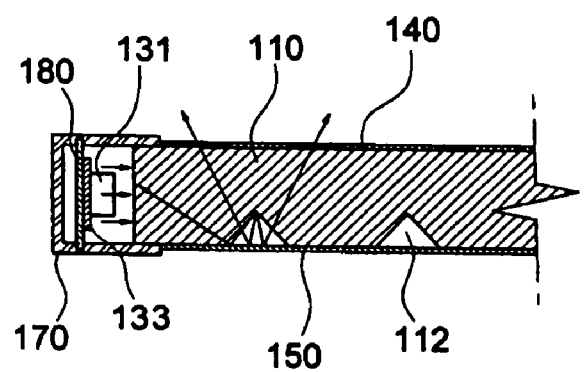
Figure 3:
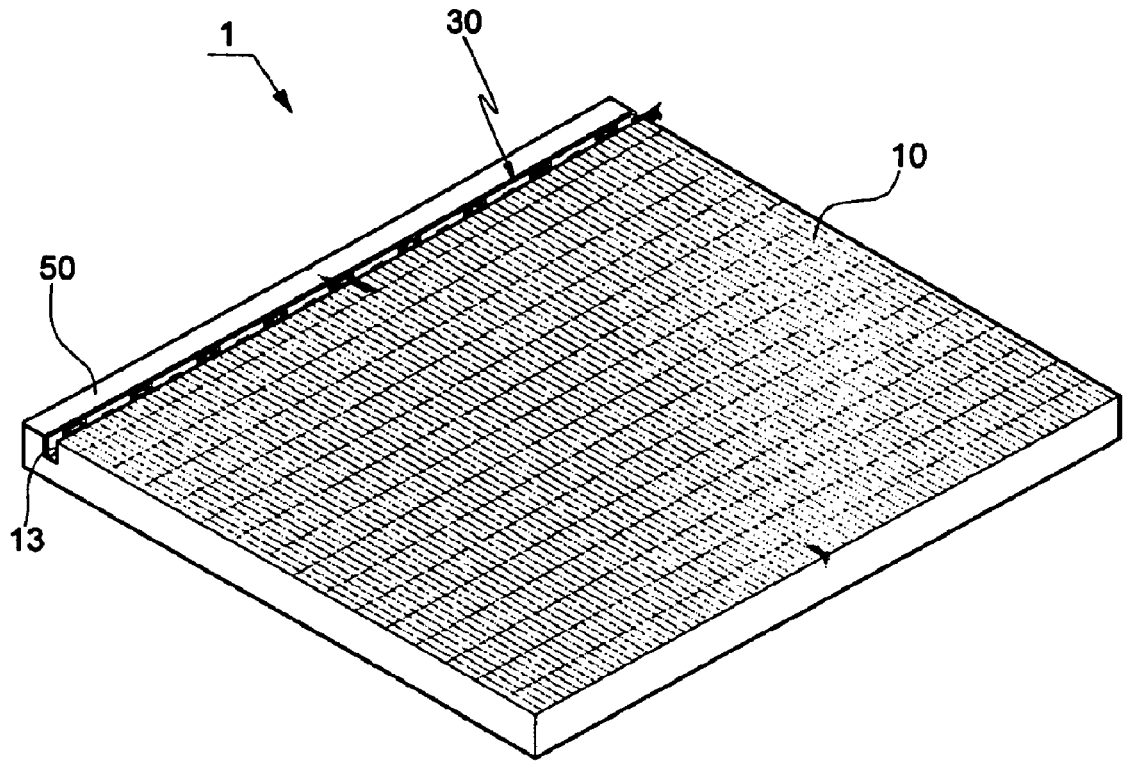
FIG. 3 is a perspective view showing the assembled state of the backlight unit of FIG. 2.
Figure 4:
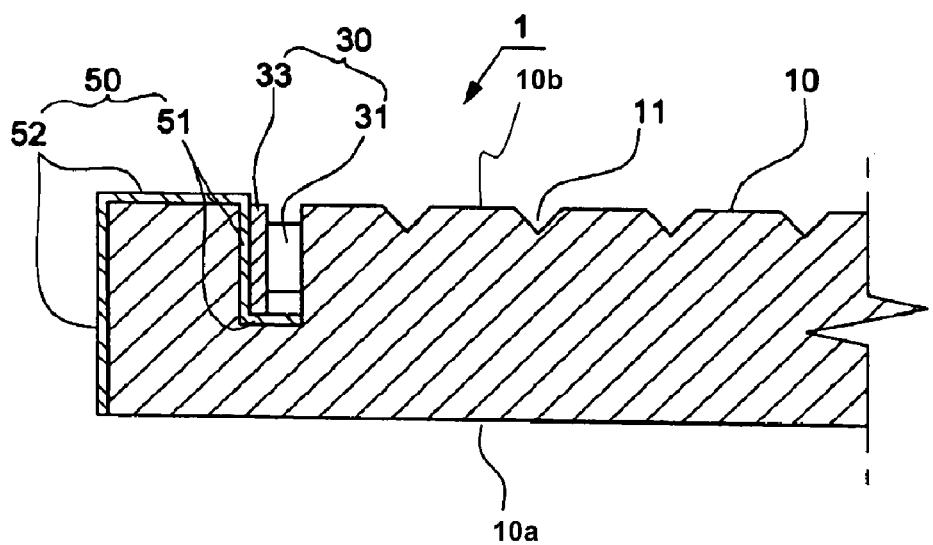
FIG. 4 is a detailed sectional view showing important parts of the backlight unit shown in FIG. 3.
Figure 5A:
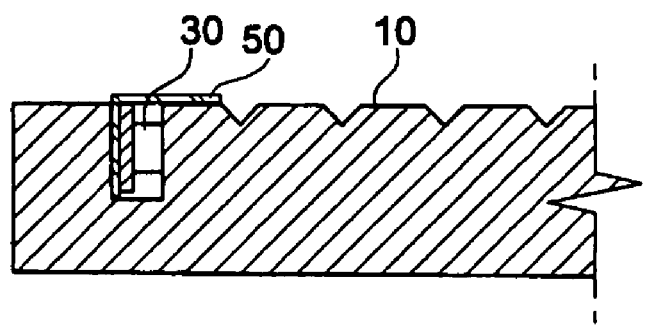
FIGS. 5a to 5g are views corresponding to FIG. 4, showing the modifications of the first embodiment.
Figure 5B:
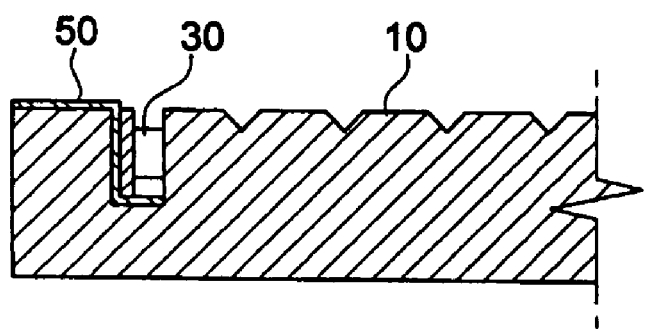
Figure 5C:
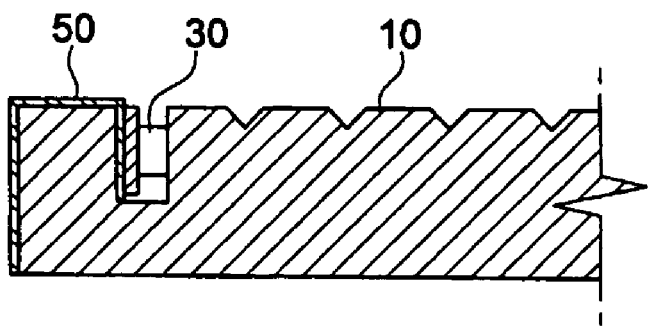
Figure 5D:
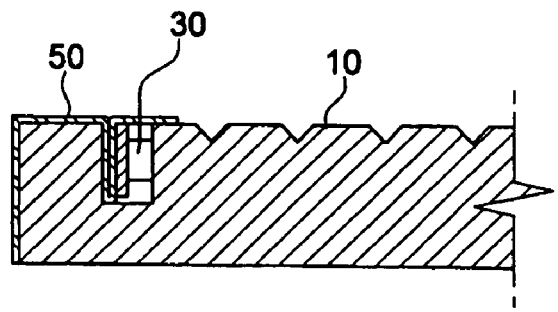
Figure 5E:
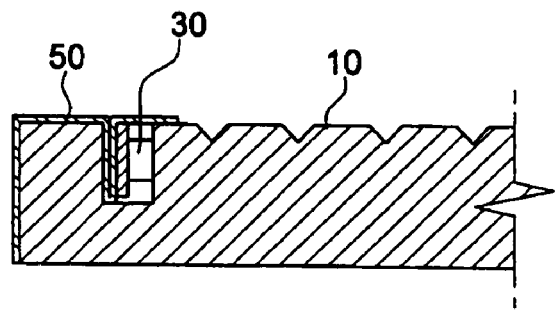
Figure 5F:
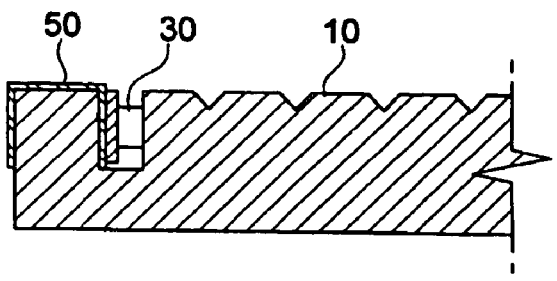
Figure 5G:
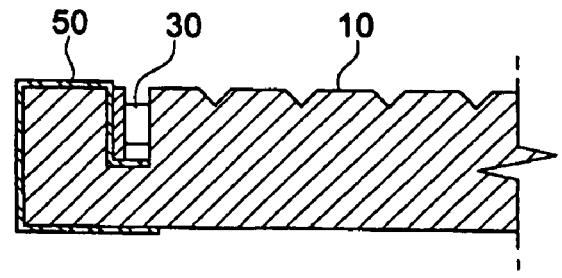

FIG. 2 is an exploded perspective view showing a backlight unit, according to the first embodiment of the present invention, FIG. 3 is a perspective view showing the backlight unit of FIG. 2 in an assembled state, and FIG. 4 is a detailed sectional view showing important parts of the backlight unit shown in FIG. 3.

That is, a light guide panel 10 of the invention comprises a light guide plate having a front surface 10a and a back surface 10b. The light guide plate has on one surface or both surfaces thereof a plurality of V-shaped notches 11, an uneven dot pattern, a printed dot pattern or a rough surface, or a light diffusion plate. As shown in FIG. 4, back surface 10b has a plurality of notches.

Figure 7:
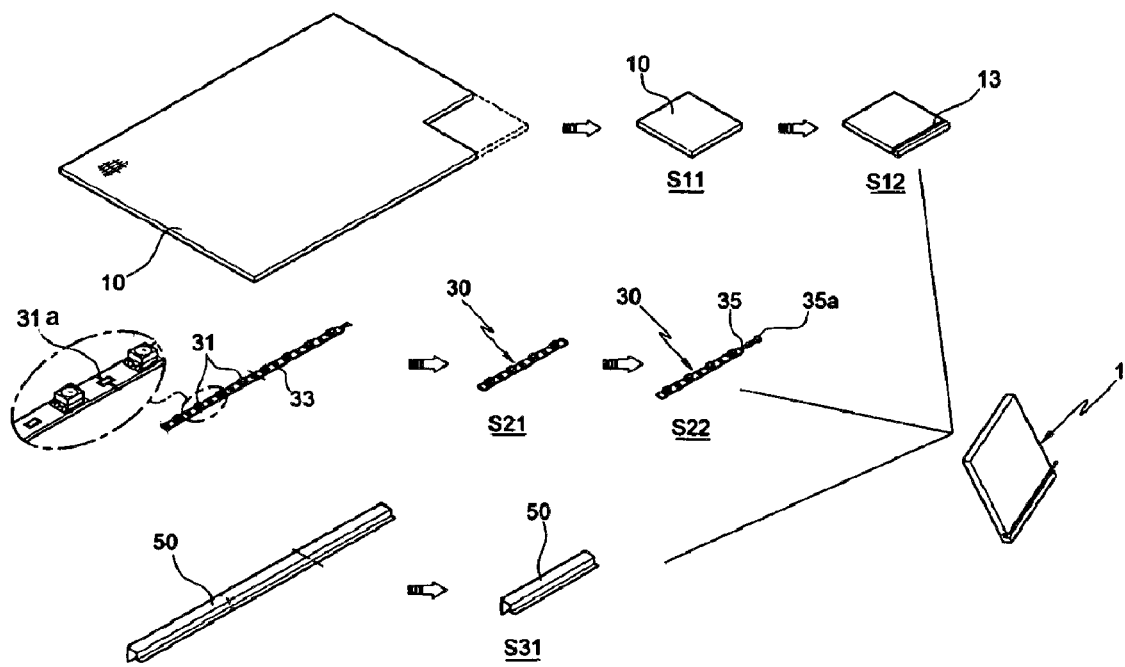
FIG. 7 is a view illustrating the process of manufacturing the backlight unit, according to the first embodiment of the present invention.

Guide slots 31a may be formed on a PCB 33 at a predetermined interval (see, FIG. 7). The PCB 33 has the shape of a strip which is thin and long, and is cut to a desired size to be connected to an electric wire.

As shown in FIGS. 5a to 5g, a thin heat radiating plate 50 includes at least one groove fitting part 51 and one exposed part 52. The groove fitting part 51, which is fitted into a groove 13 of the light guide panel 10 and includes a PCB contact part, is formed on one or more surfaces of the thin heat radiating plate 50. The exposed part 52, which is exposed to the outer surface of the light guide panel 10, is formed on one surface of the thin heat radiating plate 50, or two or three surfaces of the thin heat radiating plate 50 which is bent and extends to a predetermined position.

In a detailed description, the thin heat radiating plate 50 may be variously formed, as long as each of the groove fitting part 51 which is in contact with the PCB 33 and is installed in the groove 13 and the exposed part 52 which extends from the groove fitting part 51 to be exposed to the outside is provided on at least one surface of the thin heat radiating plate 50. Preferably, each of the groove fitting part 51 and the exposed part 52 is formed on two or more surfaces so as to maximize the heat absorbing area and the heat emitting area.

In this case, it is preferable that the thin heat radiating plate 50 comprise a thin aluminum plate.

When the thin heat radiating plate 50, that is, the thin aluminum plate, is formed to have a thickness from 0.2 mm to 0.4 mm, the thin heat radiating plate 50 is easily bent, and a step protruding from the surface of the light guide panel is very small, so that it is not necessary to compensate for the step.

Figure 6:
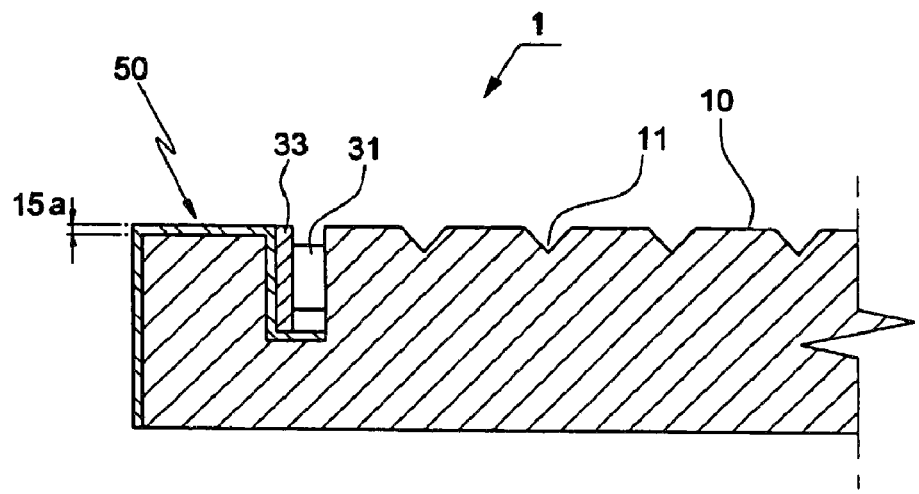
FIG. 6 is a view showing the construction of the backlight unit, according to the first embodiment of the present invention.

Further, as shown in FIG. 6, a step 15a may be formed at a portion extending from the groove 13 to an end of the light guide panel 10 on the outer surface thereof. The step 15a has a thickness corresponding to that of the thin heat radiating plate 50. That is, while the groove 13 is formed, part of the light guide panel 10 is cut by the thickness of the thin heat radiating plate 50. Thereby, the entire surface of the light guide panel 10 is formed to be flat.

Further, a luminous means 30 and the thin heat radiating plate 50 may not be provided on one side of the light guide panel, but may be provided on two opposite sides, three sides, or on all surfaces.

The manufacture and operating state of the backlight unit 1 according to this invention, constructed as described above, will be described below.

Figure 8:
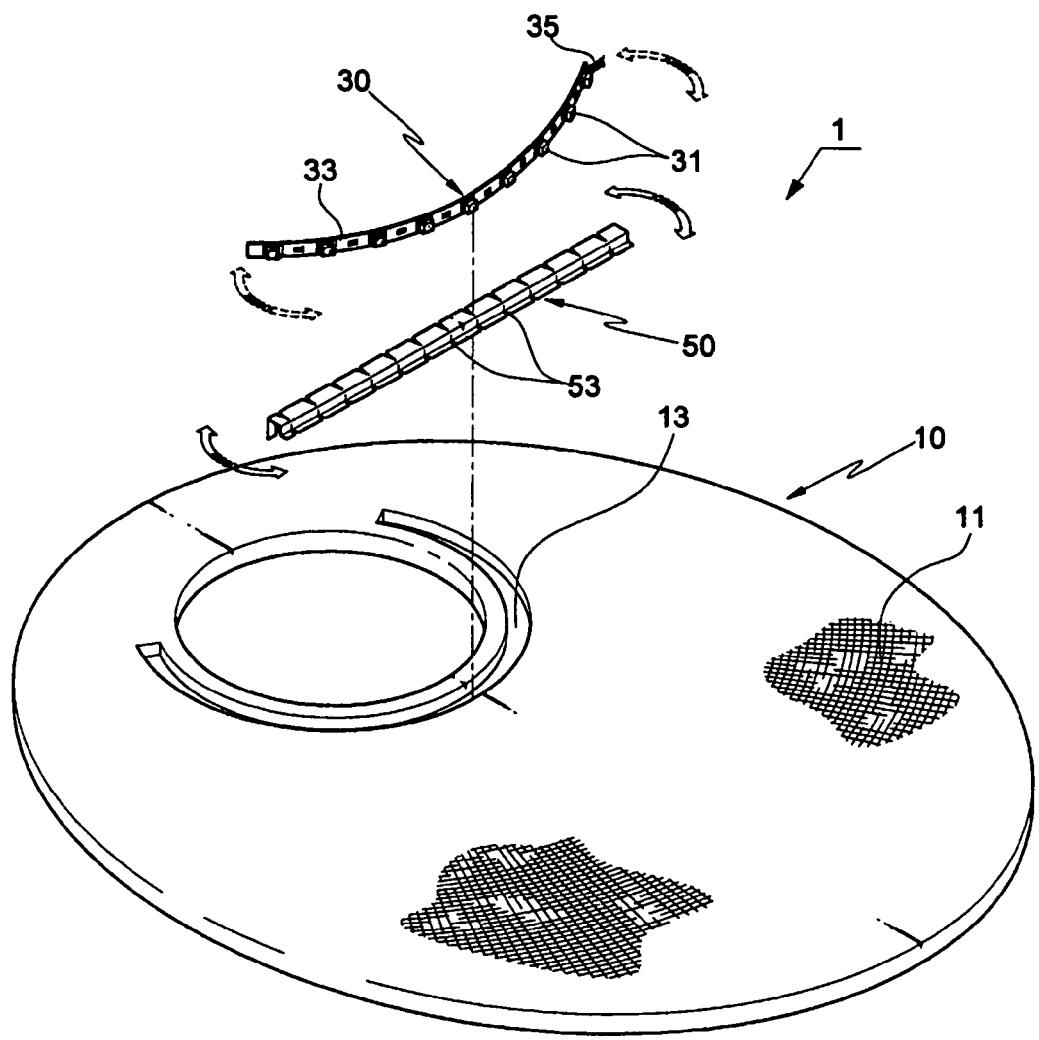
FIG. 8 is a view illustrating the process of manufacturing a curved-type backlight unit, according to the first embodiment of the present invention.

FIG. 7 is a view illustrating the process of manufacturing the backlight unit 1, according to the present invention. First, as shown in FIG. 8, a raw light guide panel 10 comprising a light guide plate having the V-shaped notches 11 or dots, or a light diffusion plate is cut to a desired size, according to the ordered specification, at step S11. The groove 13 is formed at a position adjacent to an end of the light guide panel 10, so that the luminous means is installed in the groove 13, at step S12.

At this time, the size of the groove 13 is determined so that LED (Light Emitting Diode) lamps 31 mounted on the PCB 33 and the thin heat radiating plate 50 are tightly fitted into the groove 13 and are not undesirably moved.

Next, the PCB 33 on which the LED lamps 31 are continuously mounted at a predetermined interval is cut to a length corresponding to the groove 13 at step S21, and is connected to an electric wire 35 at step S22. The electric wire 35 is provided with a contact jack 35a.

Further, the thin heat radiating plate 50, which is formed to be long in a lengthwise direction and is made of aluminum, is cut to a length corresponding to that of the PCB 33 at step S31.

Then, when the luminous means 30 and the thin heat radiating plate 50 are forcibly fitted into the groove 13 of the light guide panel 10, undesirable movement of the luminous means 30 and the thin heat radiating plate 50 is prevented by the elasticity of the light guide panel 10, the luminous means 30, and the thin heat radiating plate 50, so that the components are firmly assembled with each other. Thus, the manufacturing operation is easily completed.

As such, according to the invention, the bracket installing operation and the PCB adhering operation are not required. For example, a groove forming machine, a saw, scissors, and other simple tools are prepared at a manufacturing site, such as a retail location, and the backlight unit can be easily manufactured at such a location to be suitable for the ordered specification.

Therefore, the present invention is capable of easily satisfying the varying requirements of individuals as well as companies requiring many products having the same specification, through custom-made manufacture performed at any location.

Further, the thin heat radiating plate 50 is formed to be thin. Thus, as shown in FIG. 8, even when the PCB 33 is installed in a curved form, V-shaped notches 53 are cut in the thin heat radiating plate 50, thus allowing the thin heat radiating plate 50 to be freely bent. In this way, a contact surface of the thin heat radiating plate 50 contacting the PCB may be formed.

Thus, it is easy to comply with a circular or a fan-shaped backlight unit at a desired location. The step relative to the surface of the light guide panel 10 is very small, so that the step compensating operation using the filler, which is performed in the prior art when a large amount of backlight units is loaded or a backlight unit is inserted into a frame, is not required. Thereby, it is convenient to install the backlight unit in the frame.

Figure 9:
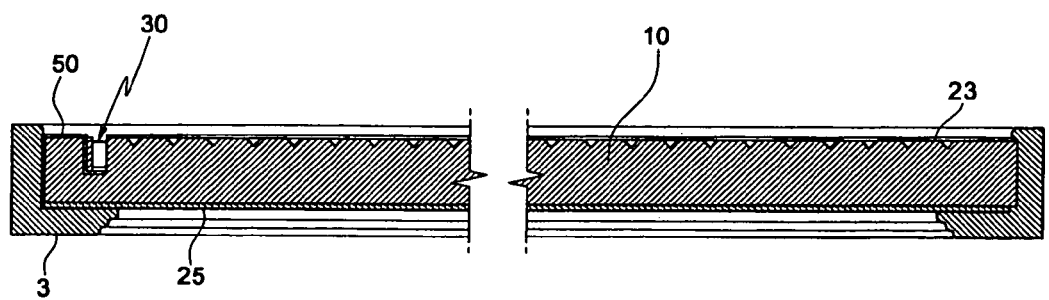
FIG. 9 is a view showing the backlight unit in use, according to the first embodiment of the present invention.
Figure 10:
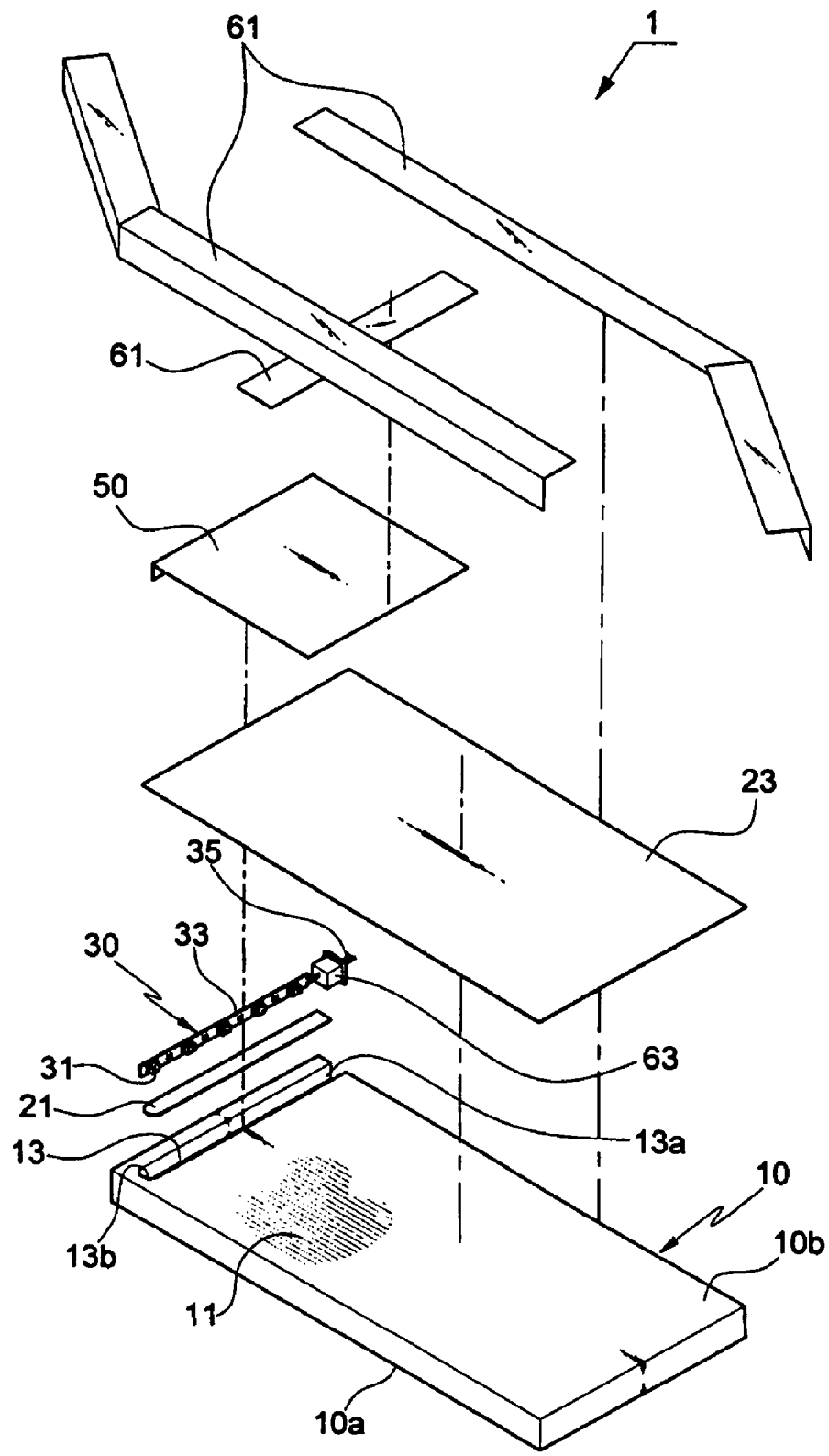
FIG. 10 is an exploded perspective view of the backlight unit, according to the first embodiment of the present invention, with some components omitted.
Figure 11:
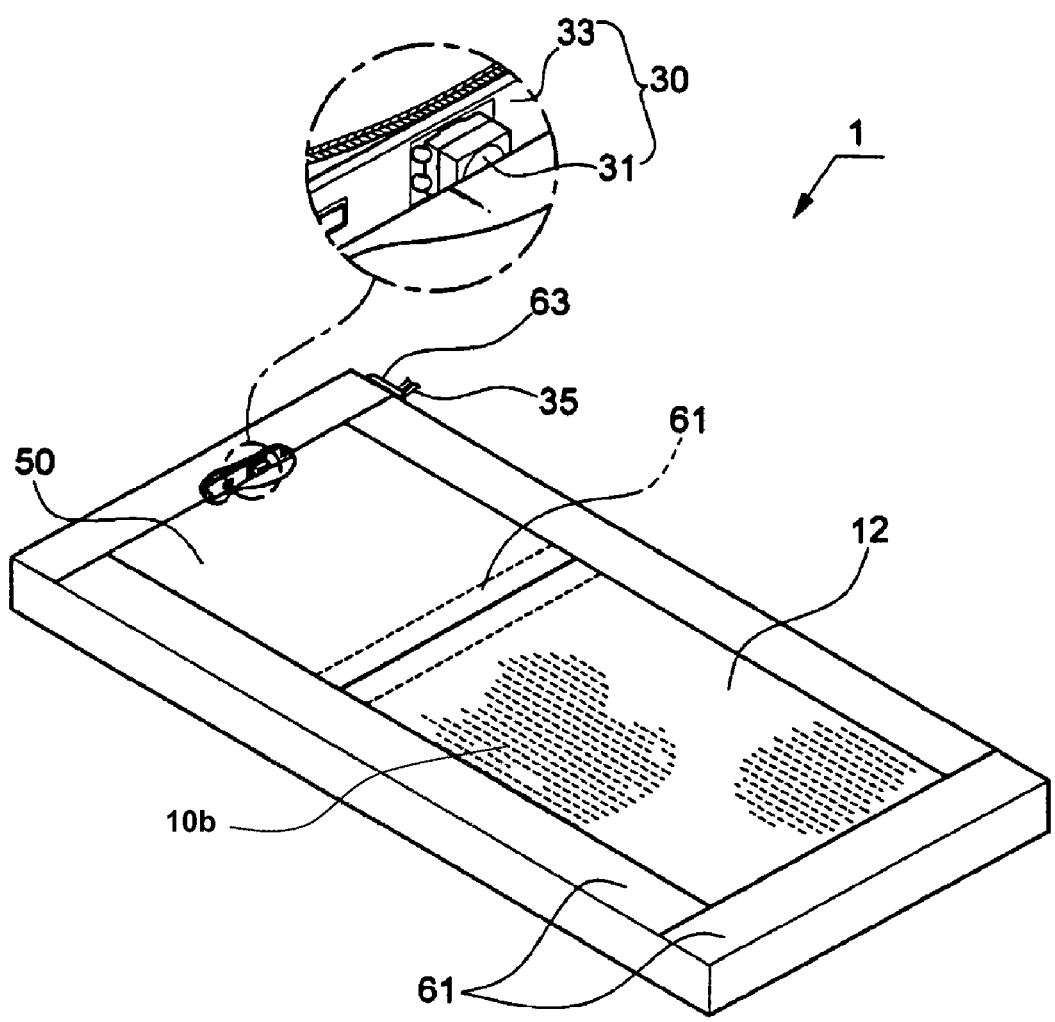
FIG. 11 is a perspective view showing the backlight unit of FIG. 10 in an assembled state.
Figure 12:
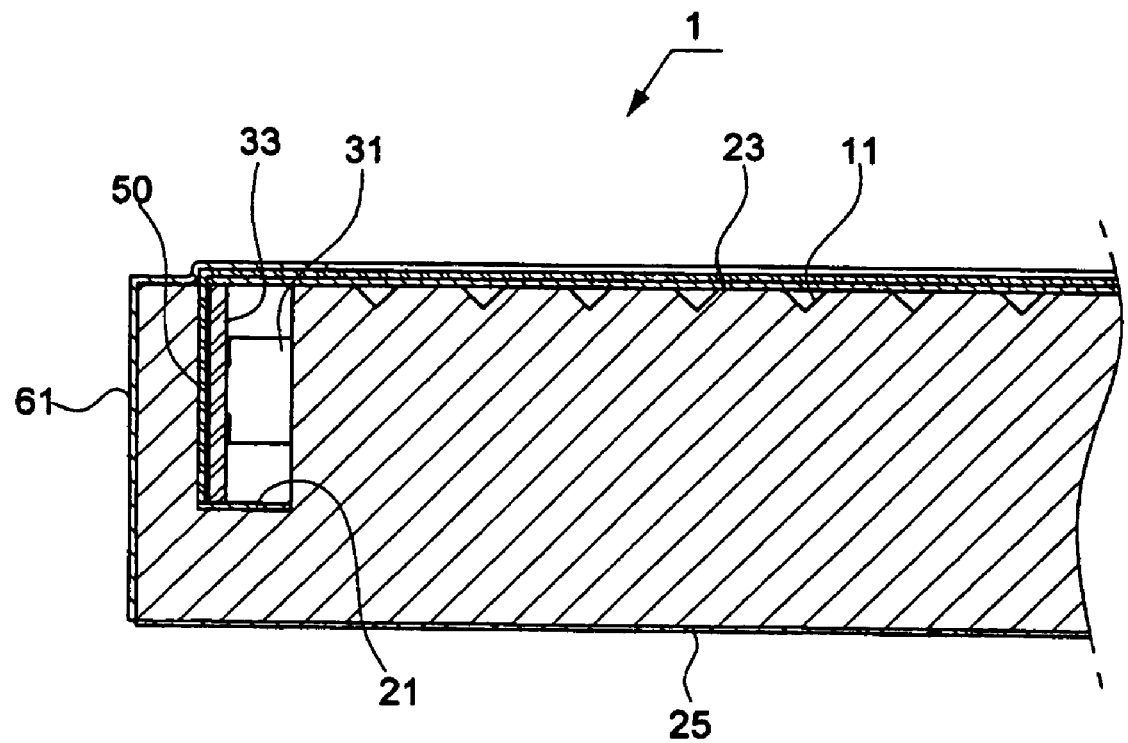
FIG. 12 is a detailed sectional view of the backlight unit FIG. 11, with some components omitted.

When the backlight unit 1 of the invention is inserted into a frame 3, with a picture or a display film 25 being placed on the front surface of the backlight unit, as shown in FIG. 9, light of the LED lamps, transmitted through the light guide panel at predetermined intervals, illuminates a picture or a photograph from behind. Thereby, the backlight unit 1 of the invention can be utilized as a decorative item for producing a distinctive atmosphere.

Meanwhile, an entrance 13a is formed on only one end of the groove 13 of the light guide panel 10 to communicate with the exterior, and a closure end 13b is provided on the other end of the groove 13, so that the entrance 13a is placed on one place. Preferably, a coupling groove 13e is formed between PCB mounting parts 13c which are provided on opposite sides, so that the electric wire 35 is inserted into the coupling groove 13e.

Preferably, a white film 21 for screening and reflecting is provided on a surface of the groove 13, which faces the front of the light guide panel 10.

The colors of the PCB 33 and the electric wire 35 installed in the groove 13, and the shadow of the LED lamps 31 are displayed on the front surface 10a of the light guide panel and a display film 25. However, the white film 21 is installed on the bottom of the groove 13, thus reflecting the light of the lamps 31 and making the PCB 33 and the electric wire 35 diffuse when viewed from the outside.

Preferably, the thin heat radiating plate 50 is installed to extend from the PCB 33 to the back surface 10b of the light guide panel 10.

Preferably, in order to efficiently prevent moisture from entering the groove 13, the entrance 13a is provided on an end of a bent part 13d which is bent from the PCB mounting part 13c.

Figure 13:
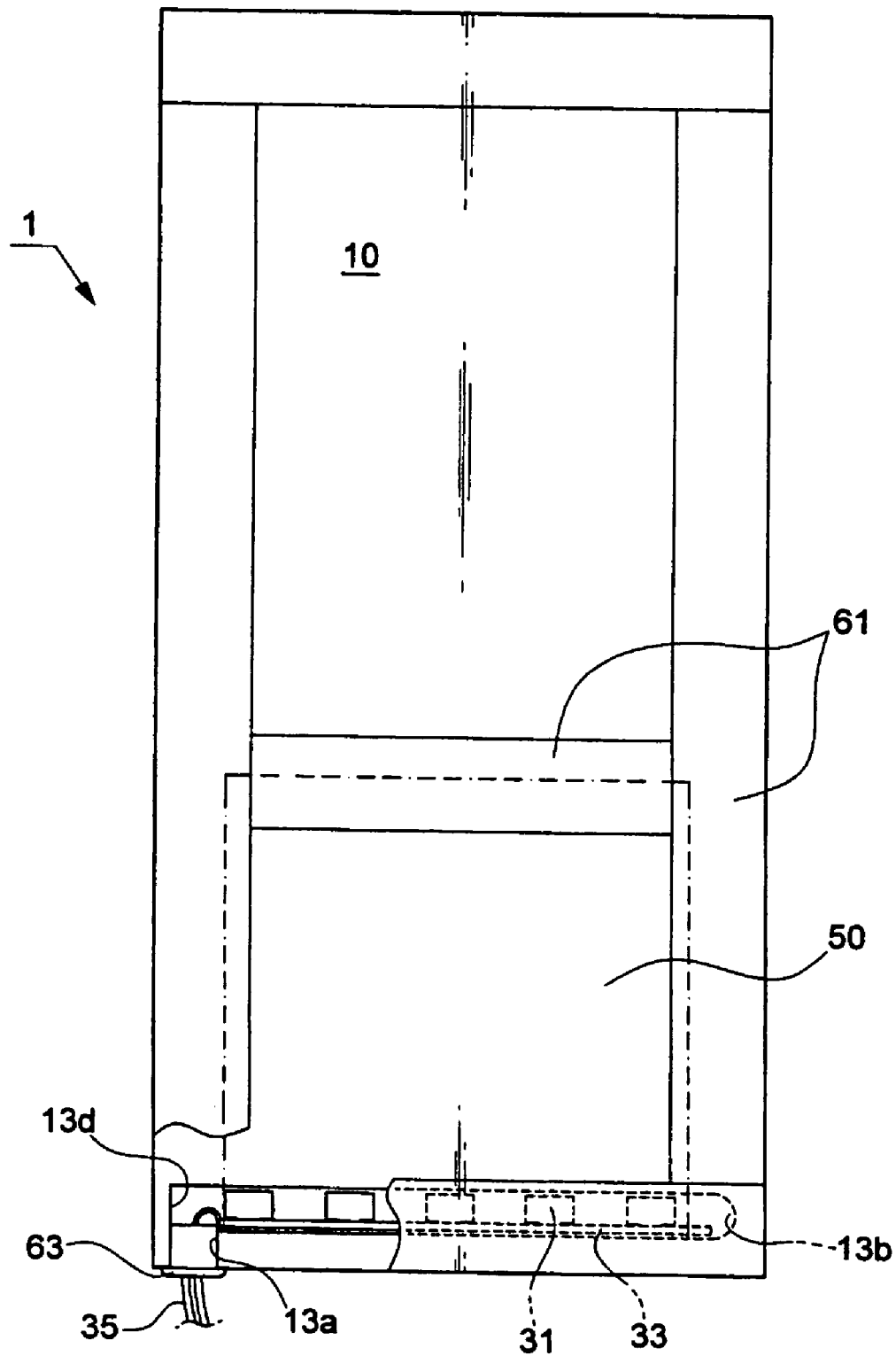
FIG. 13 is a rear view showing a light guide panel of a backlight unit, according to the second embodiment of the present invention.
Figure 14:
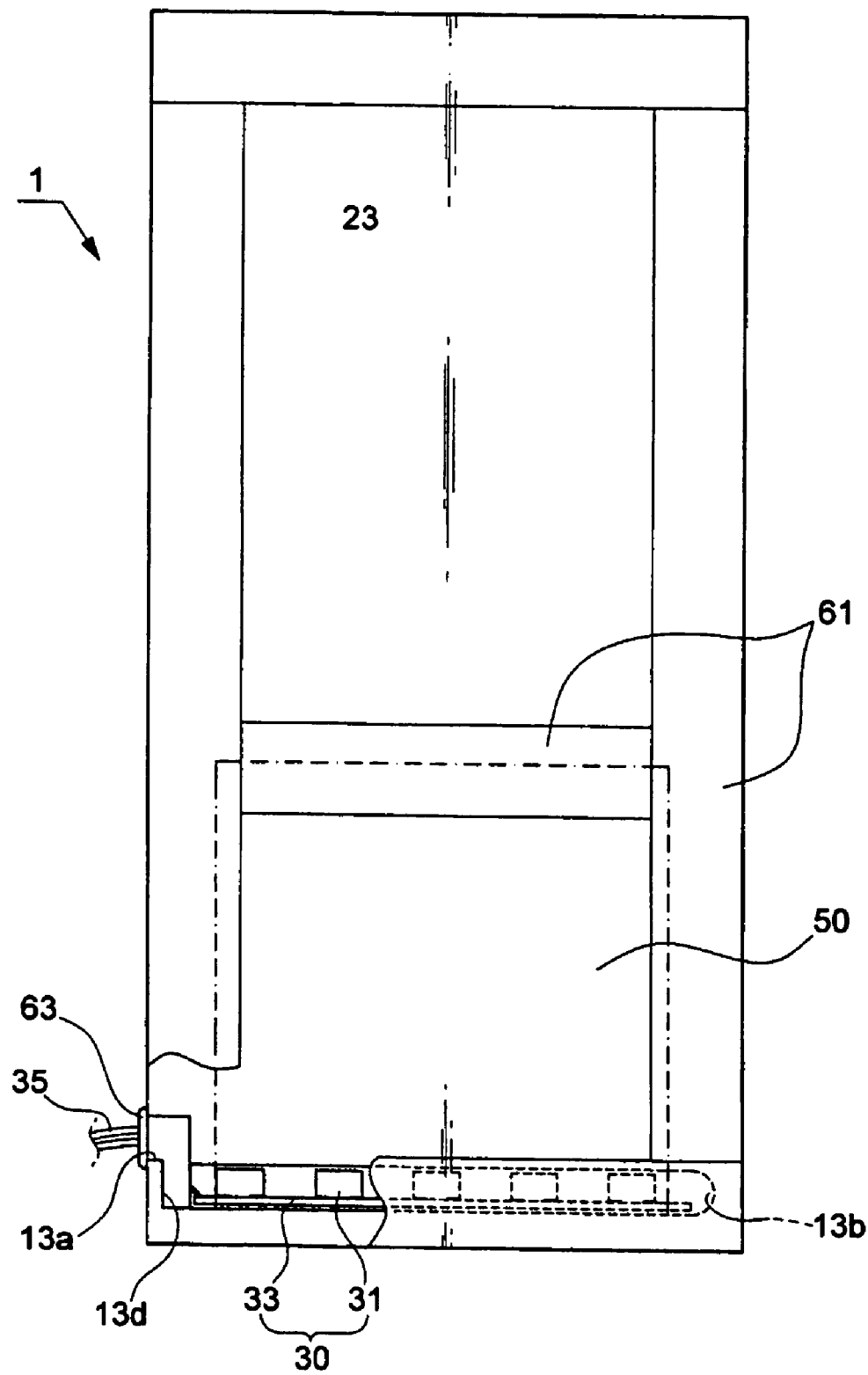
FIG. 14 is a rear view showing a light guide panel of a backlight unit, according to the third embodiment of the present invention.

As shown in FIG. 13, the bent part 13d may be bent from the PCB mounting part 13c only once to have the shape of an "L". However, when the bent part 13d is bent twice in the Z shape shown in FIG. 14, the electric wire 35 is prevented from being removed by an external force.

Further, the groove 13 is formed on the back surface of the light guide panel 10, and the luminous means 30 is installed in the groove 13. Afterwards, the thin heat radiating plate 50 and a reflection sheet 12 are sequentially assembled. Next, the thin heat radiating plate 50 is coupled to the reflection sheet 12 via a reflection tape 61, or is coupled to the light guide panel 10. Further, a sealing packing 63 is provided on the entrance 13a.

Figure 15:
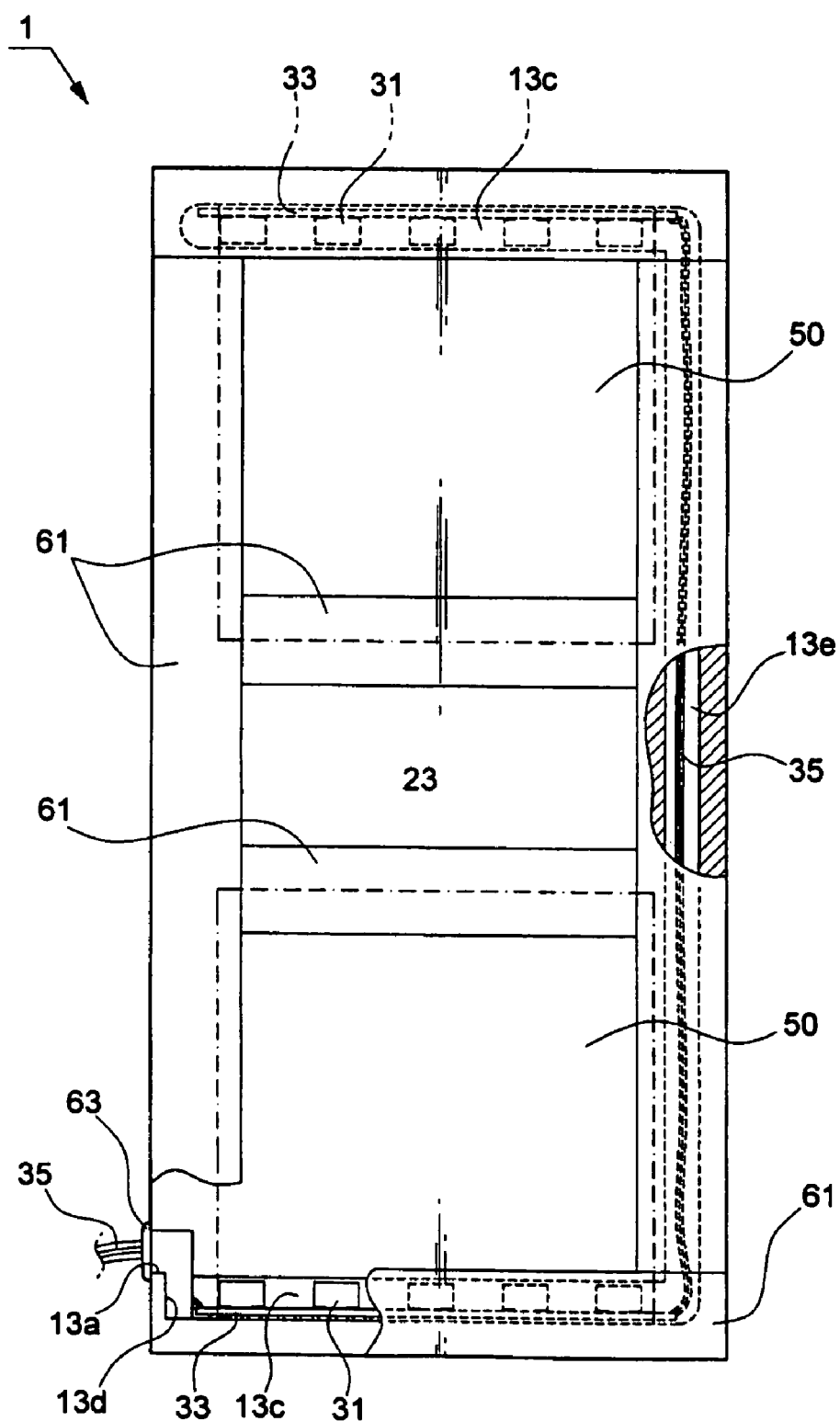
FIG. 15 is a rear view showing a light guide panel of a backlight unit, according to the fourth embodiment of the present invention.

When the light guide panel 10 has a rectangular shape, as shown in FIG. 15, the groove 13 is preferably formed in a "U" shape along the circumference of the light guide panel 10. The PCBs 33 equipped with the LED lamps 31 are mounted on the corresponding PCB mounting parts 13c, and the electric wire 35 is inserted into the coupling groove 13e which couples the PCB mounting parts 13c to each other. It is preferable that the coupling groove 13e be narrower and shallower than each PCB mounting part 13c.

Figure 16:
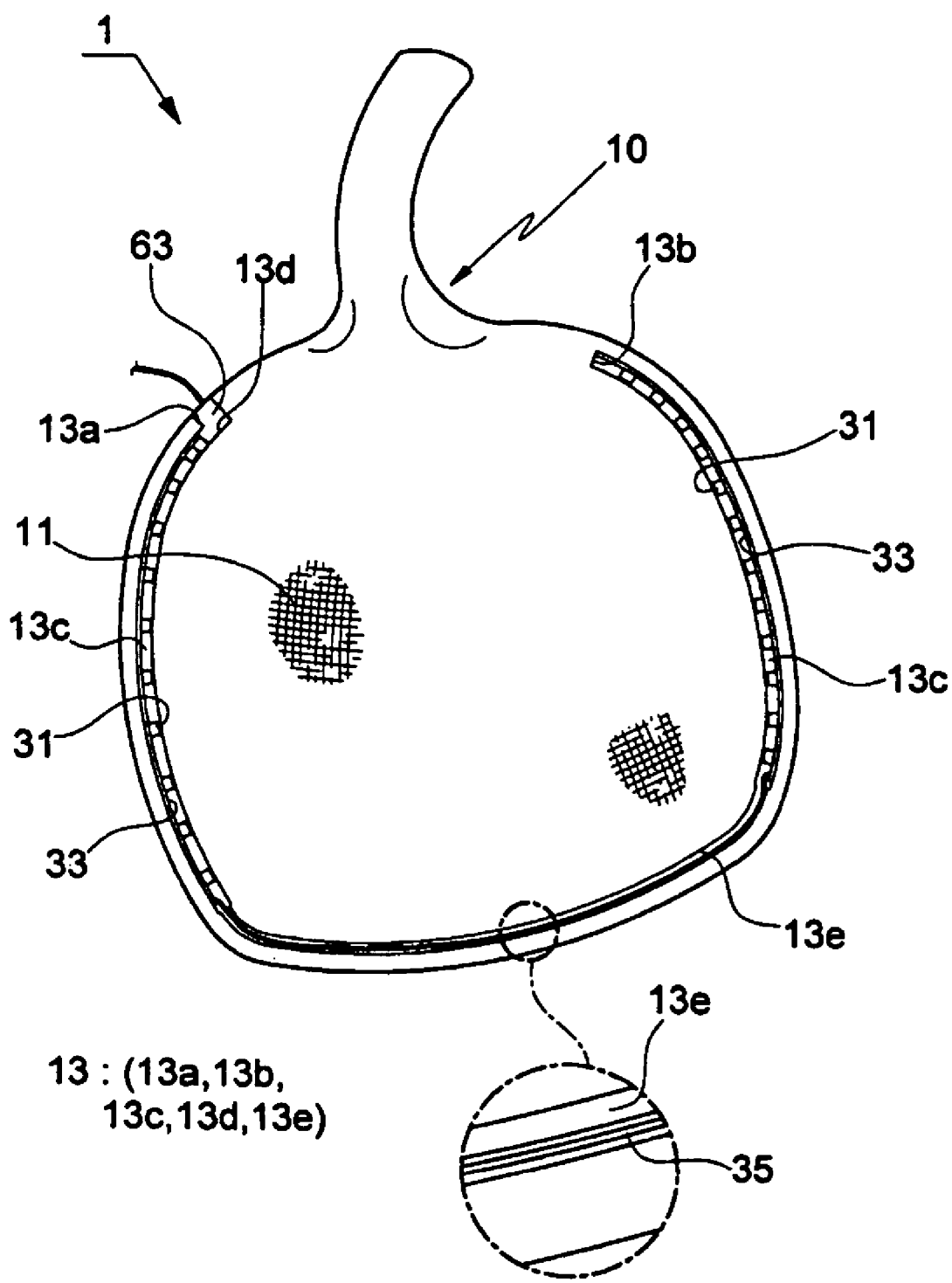
FIG. 16 is a rear view showing a backlight unit, according to the fifth embodiment of the present invention.

Further, as shown in FIG. 16, in which the thin heat radiating plate and the reflection tape are omitted, when the light guide panel has a circular shape or other shapes and the PCBs and the LED lamps are mounted on both sides, the coupling groove 13e couples the PCB mounting parts 13c to each other. Thereby, the coupling groove 13e and the PCB mounting parts 13c are formed along the circumference of the light guide panel 10.

Figure 17:
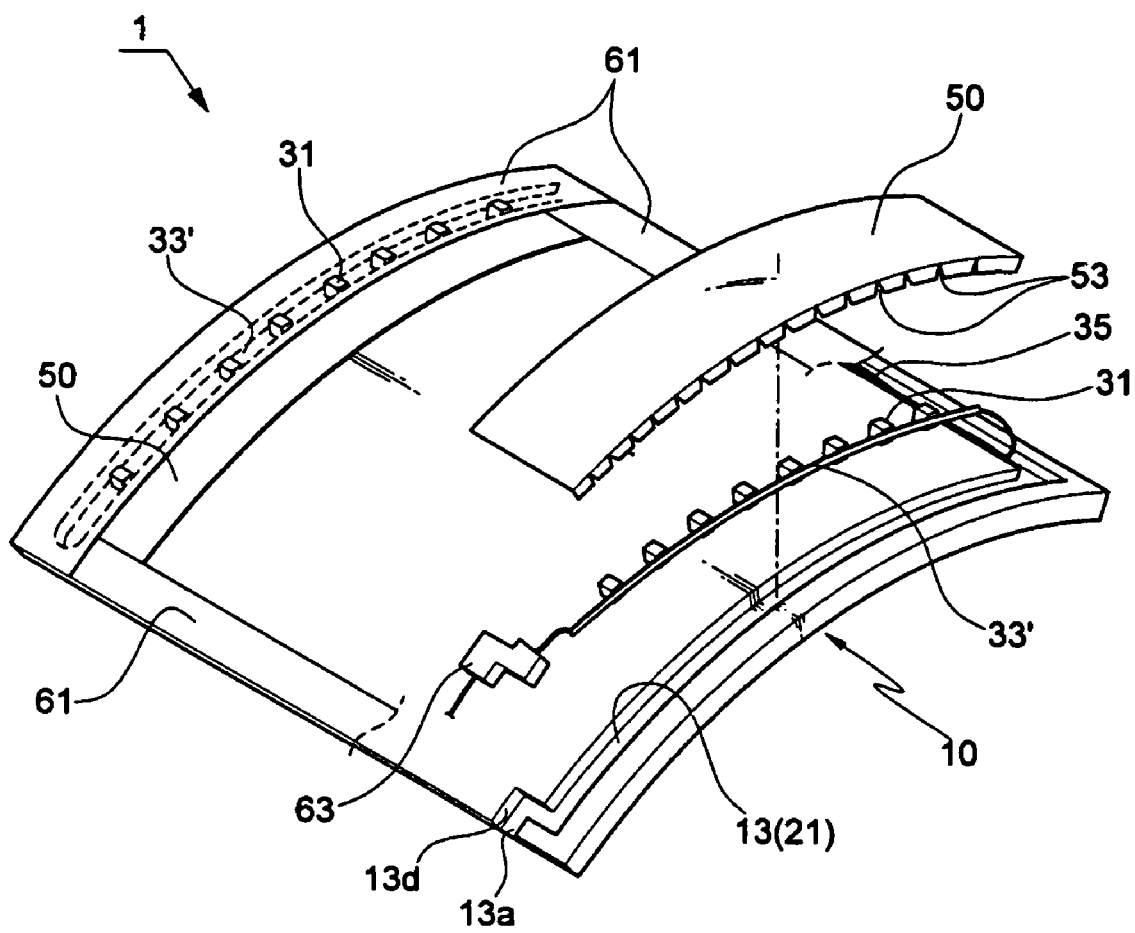
FIG. 17 is a partial exploded perspective view of a backlight unit, according to the sixth embodiment of the present invention.

Further, when the light guide panel 10 is formed to have a three-dimensional shape (see, FIGS. 17 and 18), the PCB 33 installed in the groove 13 comprises a flexible PCB 33' which is easily bent. The flexible PCB has excellent bendability and assemblability, so that it is suitable for a three-dimensional arrangement.

Preferably, the thin heat radiating plate 50 used together with the flexible PCB 33' has a plurality of notches 53 to correspond to the shape of the groove 13.

The notches 53 may be alternately formed on the side of the thin heat radiating plate 50 contacting the flexible PCB 33' and the opposite side. The thin heat radiating plate 50 having the notches 53 formed in this way may be mounted on the light guide panel 10 regardless whether it is bent in any shape.

The reflection tape 61, provided along the circumference of the light guide panel 10, uses a white adhesive tape, called a 'side tape', which is generally used to prevent the loss of light.

A reflection sheet 23 is attached to the back surface of the light guide panel 10.

The outer portion of the light guide panel 10 is generally machined on the plane using a carving tool. The groove 13 in which the luminous means 30 is installed is simultaneously machined to be in the same plane (see FIGS. 15 and 16).

The PCB 33, on which the LED lamps 31 are mounted at predetermined intervals, is fitted into the groove 13 of the light guide panel formed as such, and the thin heat radiating plate 50 is installed. The sealing packing 63 threaded in the electric wire 35 is provided on the entrance 13a of the groove 13. Subsequently, the circumference of the exposed part of the thin heat radiating plate 50, the edge of the light guide panel 10, and the groove 13 including the coupling groove 13e which is open yet are covered with the reflection tape 61, thus simultaneously performing a waterproof sealing operation and securing the thin heat radiating plate 50. Thereby, the manufacture of the backlight unit is completed.

According to the invention manufactured in this way, the entrance 13a serving as the exterior passage of the groove 13 is formed at only one place, and the waterproof sealing operation and the operation of securing the luminous means 30 and the thin heat radiating plate 50 are performed using the reflection tape 61. Thus, the present invention provides excellent waterproofness and affords ease of manufacture.

In other words, the groove 13 in which the PCB is installed is sealed with tape at the back surface 10b of the light guide panel, and the sealing packing 63 is provided at or silicone is input to the entrance 13a, which is the only passage communicating with the exterior, thus completely preventing water from entering. Thereby, even if the backlight unit is installed under water, it does not cause any problem because it is waterproof. Therefore, the life-span of the luminous means is maximized and the applicable range of the backlight unit is increased.

Further, even when the luminous means 30 is installed on opposite sides of the light guide panel 10, the electric wire 35 is not exposed to the outside but is installed in the coupling groove 13e to be sealed therein. That is, all components are housed and embedded within the thickness of the light guide panel 10, so that components other than the plate do not protrude to the outside and do not sag. Thereby, the backlight unit is resistant to external interference and impact, and is easy to handle. Further, the possibility of damage to the backlight unit is minimized, and it is convenient to install and load the backlight unit.

Since the frame or the heat radiating plate are not exposed outside the edge of the light guide panel 10 and the white film 21 is installed in the groove 13, the light of the LED lamps 31 installed in the groove 13 is reflected on a display screen, and the PCB 33, the LED lamps 31, and the electric wire 35 are not reflected on the front surface 10a of the light guide panel. Thus, a neat display screen is achieved.

Figure 18:
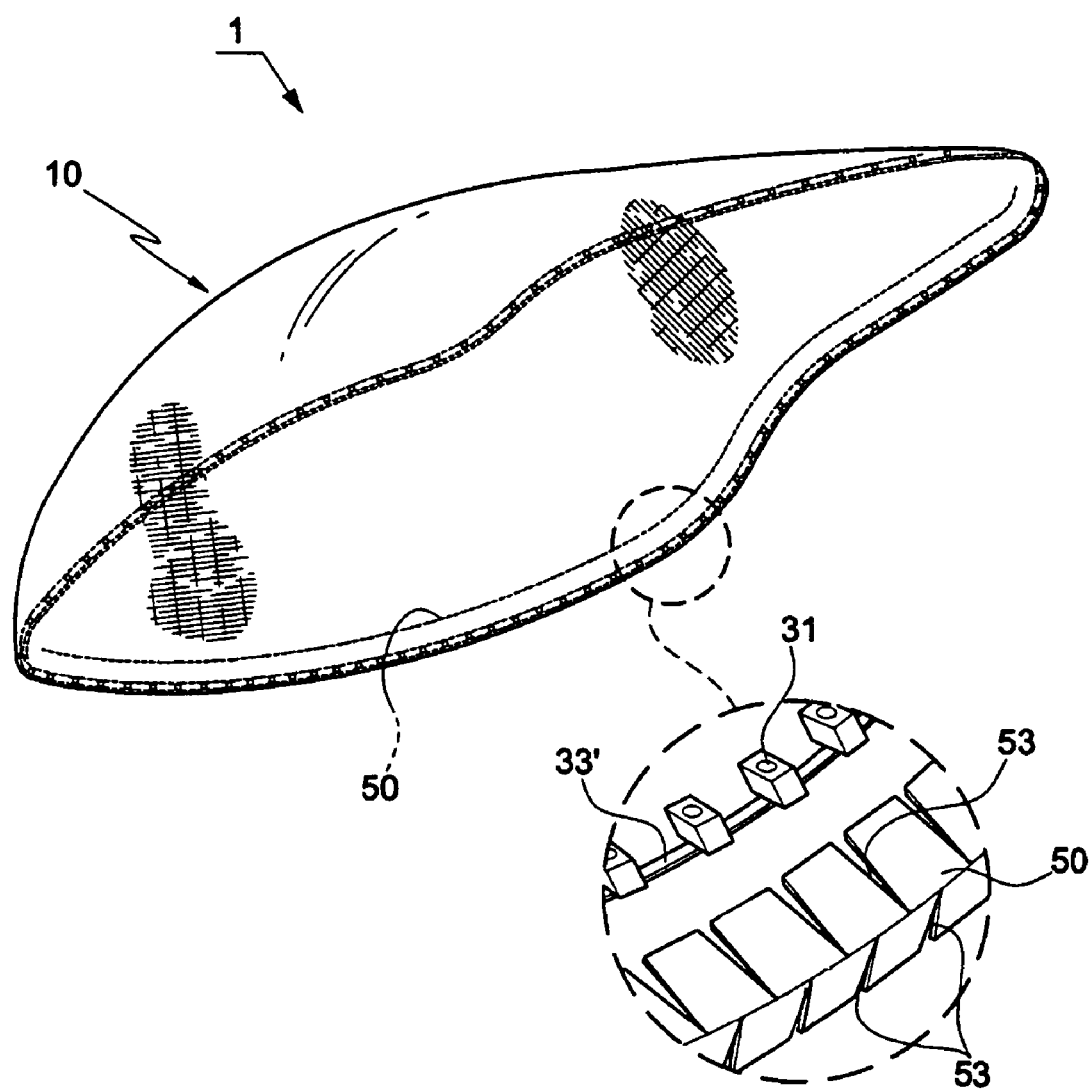
FIG. 18 is a view showing the construction of a backlight unit, according to the seventh embodiment of the present invention.

The most important advantage of the present invention is to freely manufacture the backlight unit having the curved shape or the three-dimensional shape, using the flexible PCB 33', without the frame used in the prior art. The light guide panel may be manufactured to have any shape using a thermal deformation forming process. For example, as shown in FIG. 18, the light guide panel may be manufactured to be suitable for the cover of a cockpit of a helicopter, a lower end of which varies in height and curvature. Thus, the flexible PCB 33' which is freely bent and the thin heat radiating plate 50 having the notches 53 are installed in the curved groove 13, so that it is possible to manufacture various three-dimensional backlight units.

Further, the thin heat radiating plate 50 can be installed throughout a wide range to cover the back surface 10b of the light guide panel 10, so that the heat emitting operation of the luminous means 30 is efficiently carried out. The operation of securing the thin heat radiating plate 50 to the light guide panel 10 is implemented using the reflection tape 61. Thus, it is easy to manufacture the backlight unit.

Figure 19:
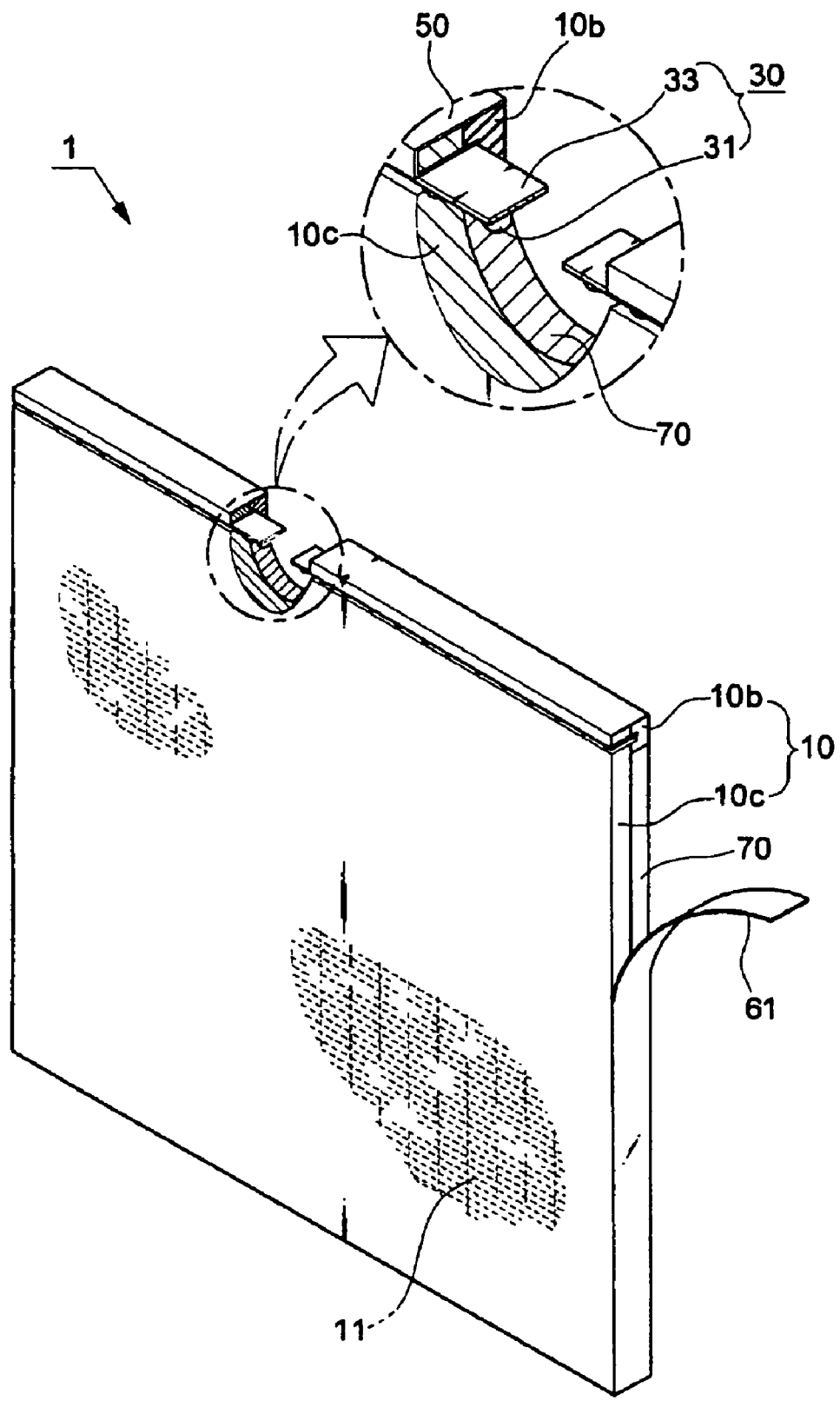
FIG. 19 is a partial cutaway perspective view showing the construction of a backlight unit, according to the eighth embodiment of the present invention.
Figure 20:
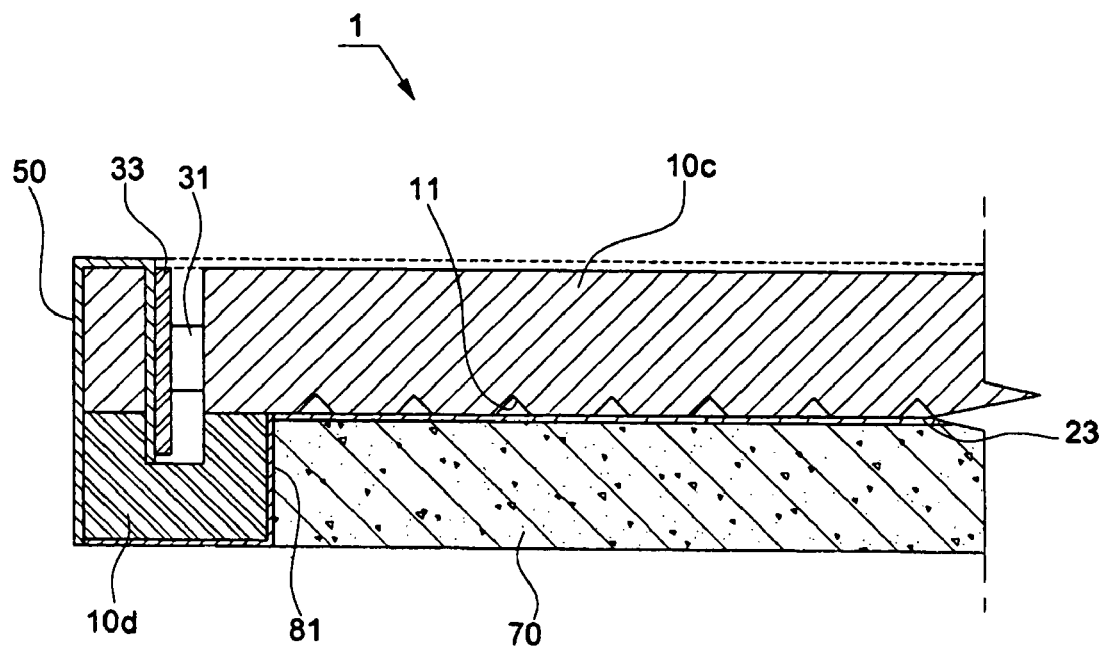
FIG. 20 is a sectional view of a backlight unit, according to the ninth embodiment of the present invention, with some components omitted.
Figure 21:
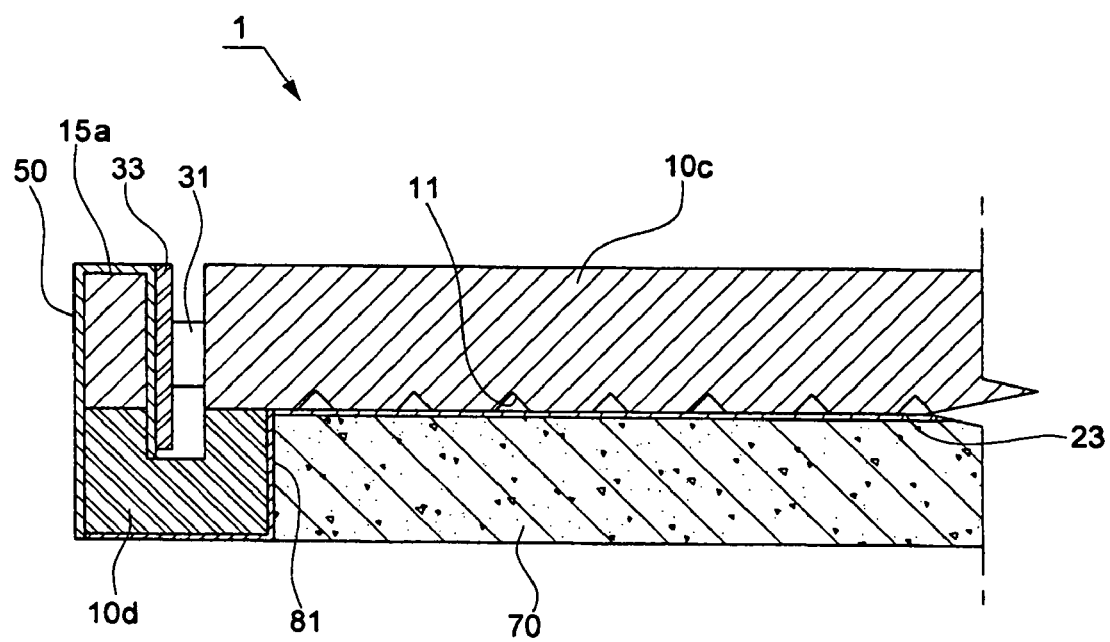
FIG. 21 is a sectional view of a backlight unit, according to the tenth embodiment of the present invention, with some components omitted.

Meanwhile, as in the embodiments shown in FIGS. 19 to 21, the light guide panel 10 includes a slim panel 10c which is thinner than the depth of the groove 13, and an adding piece 10d which is partially provided to form the groove 13.

In this case, the adding piece 10d combines with the slim panel 10c, thus providing the thickness for forming the groove 13. The adding piece 10d is made of a material which may adhere to the slim panel 10c.

That is, the adding piece 10d is added to complement the insufficient thickness of the slim panel 10c, thus forming a groove 13 having sufficient depth for installation of the PCB 33. Preferably, the adding piece 10d having a narrow width is attached to the part for mounting the luminous means, which is provided in the slim panel 10c.

Further, the adding piece 10d adheres to the back of the groove forming part of the slim panel 10c, and a reflection sheet 81 is provided on part of the outer surface of the adding piece 10d to prevent the leakage of light.

According to another embodiment of the present invention, a compensation panel 70 is provided on the back of the slim panel 10c and connected to the adding piece 10d to form a flat surface.

The compensation panel 70 may be made of a porous shock absorbing material, such as Styrofoam, or MDF (Medium Density Fiberboard).

As shown in FIG. 6, the slim panel 10c may have a step 15a which extends from the groove 13 to an end of the slim panel 10c and has a depth corresponding to the thickness of the thin heat radiating plate 50.

Further, the thin heat radiating plate 50 includes a part which is provided in the groove 13 while contacting the PCB 33. The thin heat radiating plate 50 is bent from the PCB contact part and extends to surround the outer portions of the slim panel 10c and the adding piece 10d. That is, the thin heat radiating plate 50 is preferably formed throughout a larger area so as to maximize a heat absorbing area and a heat emitting area.

The groove 13 is preferably formed on the side of the slim panel 10c. However, the groove 13 may be formed on the side of the adding piece 10d.

As such, since the light guide panel comprises the relatively thin slim panel 10c, the light guide panel is smoothly bent. Thus, even when the backlight unit is mounted on a curved surface, such as a cylindrical structure, it is easy to make it comply with the curve surface, so that it is very convenient and easy to install the backlight unit at a desired spot.

Hereinbefore, the preferred embodiments of the present invention have been described with reference to the accompanying drawings. It is to be understood that the words which have been used are words of description rather than limitation and that changes within the purview of the appended claims may be made without departing from the true scope and spirit of the invention. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a backlight unit, which does not require a bracket installing operation or a PCB adhering operation, thus reducing manufacturing costs of the backlight unit.

Second, the present invention provides a backlight unit, in which a heat radiating plate comprises a thin plate, so that it is convenient to deal with the case where a light guide panel or a PCB is installed in a curved shape, and it is not necessary to compensate for a surface step.

Third, the present invention provides a backlight unit, which is easily custom-made at a desired site according to consumers' special requirements, thus easily and rapidly satisfying individuals' demands as well as companies' demands, thus extending the applicable range to a backlight unit for individual use, therefore maximizing the accessibility to consumers, and creating vast demands.

Fourth, the present invention provides a backlight unit, in which an entrance of a groove receiving a luminous means is provided on only one place, and the groove is sealed with tape, thus affording excellent waterproofness, therefore protecting the luminous means and a circuit even if the backlight unit is installed under water. Thereby, the life-span of lamps is maximized.

Fifth, the present invention provides a backlight unit, in which components installed in a groove, for example, a PCB, are not exposed to the front surface of a light guide panel, thus providing a neat and tidy display screen, and in which all components including an electric wire are embedded within the thickness of the light guide panel, thus being resistant to external interference or impact, being easy to handle, mining damage, and allowing the packing or installing operation to be conveniently performed.

Sixth, the present invention provides a backlight unit, in which a light guide panel becomes slim, thus increasing flexibility and achieving lightness, therefore being easy to bend and install to be suitable for a curved structure, and being easy to handle.

Seventh, the present invention allows various three-dimensional backlight units to be manufactured using a flexible PCB, thus remarkably extending the applicable range of the backlight unit.

The invention claimed is:

1. A backlight unit, comprising:
a light guide panel which includes a light guide plate having on a front or back surface thereof a plurality of notches, an uneven dot pattern, a printed dot pattern or a rough surface, or a light diffusion plate;
at least one luminous means including light emitting diodes (LEDs) mounted on a front surface of a printed circuit board (PCB); and
a groove having two sidewalls and formed along an extremity of the front or back surface of the light guide panel,
characterized in that the luminous means and a part of a thin heat radiating plate are fitted between the two sidewalls of the groove with the heat radiating plate and a back surface of the printed circuit board being in direct contact with each other, and the light emitting diodes being in direct contact with one sidewall of the groove.

2. The backlight unit as set forth in claim 1, wherein the groove has one end extending to an edge surface of the light guide plate, through which an electric wire is provided into the groove to supply electricity to the luminous means.

3. The backlight unit as set forth in claim 2, wherein the groove is formed curved and a plurality of V-shaped cutoff sections are formed on the thin heat radiating plate to permit the heat radiating plate to be fitted into the curved groove.

4. The backlight unit as set forth in claim 2, wherein two luminous means are provided at both ends of the groove to form an intermediate groove part therebetween, in which the two luminous means are connected to each other by the electric wire.

5. The backlight unit as set forth in claim 1, wherein the groove is formed deeper than a thickness of the light guide plate and a separate light guide piece is attached to the light guide plate to receive a lower part of the groove therein.

6. The backlight unit as set forth in claim 5, wherein the groove is formed curved and a plurality of V-shaped cutoff sections are formed on the thin heat radiating plate to permit the heat radiating plate to be fitted into the curved groove.

7. The backlight unit as set forth in claim 1, wherein the thin heat radiating plate is made of aluminum material, and the heat radiating plate is bent at least once, so that the said part of the heat radiating plate is fitted into the groove to be in contact with the back surface of the PCB and the remaining part of the heat radiating plate is exposed to an outside of the light guide panel.

8. The backlight unit as set forth in claim 7, wherein the groove is formed curved and a plurality of V-shaped cutoff sections are formed on the thin heat radiating plate to permit the heat radiating plate to be fitted into the curved groove.

9. The backlight unit as set forth in claim 1, wherein a white-colored reflection film is provided on a part of the surface of the light guide plate to cover the groove, so that light can be reflected on the film and the luminous means and the electric wire cannot be seen from the outside.

10. The backlight unit as set forth in claim 9, wherein the groove is formed curved and a plurality of V-shaped cutoff sections are formed on the thin heat radiating plate to permit the heat radiating plate to be fitted into the curved groove.

11. The backlight unit as set forth in claim 1, wherein the groove is formed curved and a plurality of V-shaped cutoff sections are formed on the thin heat radiating plate to permit the heat radiating plate to be fitted into the curved groove.

12. The backlight unit as set forth in claim 1, further comprising reflection tape covering the groove to provide a waterproof sealing operation and to secure the thin heat radiating plate.

13. A backlight unit, comprising:
a light guide panel which includes a light guide plate having on a front or back surface thereof a plurality of notches, an uneven dot pattern, a printed dot pattern or a rough surface, or a light diffusion plate;
at least one luminous means including light emitting diodes (LEDs) mounted on a front surface of a flexible printed circuit board (PCB); and
a curvilinear groove having two sidewalls and formed along an extremity of the front or back surface of the light guide panel,
characterized in that the luminous means and a part of a thin flexible heat radiating plate are fitted between two sidewalls of the curvilinear groove with the thin flexible heat radiating plate and a back surface of the flexible printed circuit board being in direct contact with each other, and the light emitting diodes being in direct contact with one sidewall of the curvilinear groove.

14. The backlight unit as set forth in claim 13, wherein the curvilinear groove has one end extending to an edge surface of the light guide plate, through which a flexible electric wire is provided into the curvilinear groove to supply electricity to the luminous means.

15. The backlight unit as set forth in claim 14, wherein two luminous means are provided at both ends of the curvilinear groove to form an intermediate groove part therebetween, in which the two luminous means are connected to each other by the flexible electric wire.

16. The backlight unit as set forth in claim 13, wherein the curvilinear groove is formed deeper than a thickness of the light guide plate and a separate light guide piece is attached to the light guide plate to receive a lower part of the curvilinear groove therein.

17. The backlight unit as set forth in claim 13, wherein the thin flexible heat radiating plate is made of aluminum material, and the flexible heat radiating plate is bent at least once, so that the said part of the flexible heat radiating plate is fitted into the curvilinear groove to be in contact with the back surface of the PCB and the remaining part of the flexible heat radiating plate is exposed to an outside of the light guide panel.

18. The backlight unit as set forth in claim 13, wherein a white-colored reflection film is provided on a part of the surface of the light guide plate to cover the curvilinear groove, so that light can be reflected on the film and the luminous means and the flexible electric wire cannot be seen from the outside.

19. The backlight unit as set forth in claim 13, wherein a plurality of V-shaped cutoff sections are formed on the thin flexible heat radiating plate to permit the heat radiating plate to be fitted into the curvilinear groove.

20. The backlight unit as set forth in claim 13, further comprising reflection tape covering the curvilinear groove to provide a waterproof sealing operation and to secure the thin flexible heat radiating plate.

* * * * *

UNITED STATES PATENT AND TRADEMARK OFFICE
CERTIFICATE OF CORRECTION

PATENT NO. : 7,473,022 B2  Page 1 of 1
APPLICATION NO. : 11/417733
DATED : January 6, 2009
INVENTOR(S) : Tae Kun Yoo It is certified that error appears in the above-identified patent and that said Letters Patent is hereby corrected as shown below:

Column 9, line 33, "mining" should be changed to --minimizing--.

Signed and Sealed this

Twenty-fifth Day of May, 2010

David J. Kappos
*Director of the United States Patent and Trademark Office*